March 4, 1952
J. M. CAMPBELL
2,587,965
INSECTICIDE SPRAYER
Filed Oct. 11, 1948
5 Sheets-Sheet 3
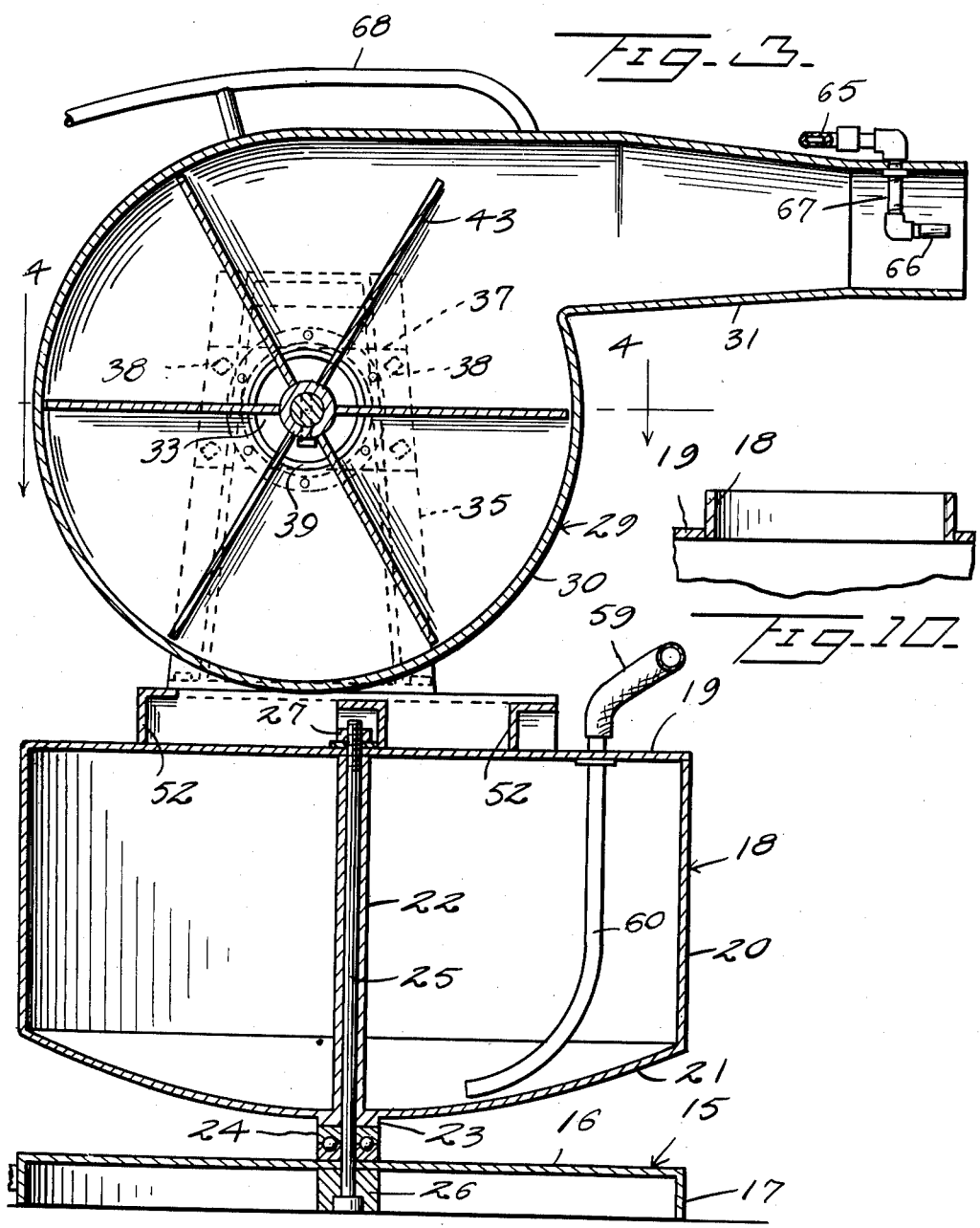
Inventor
J. M. Campbell
By
Kimmel & Crowell Attys.

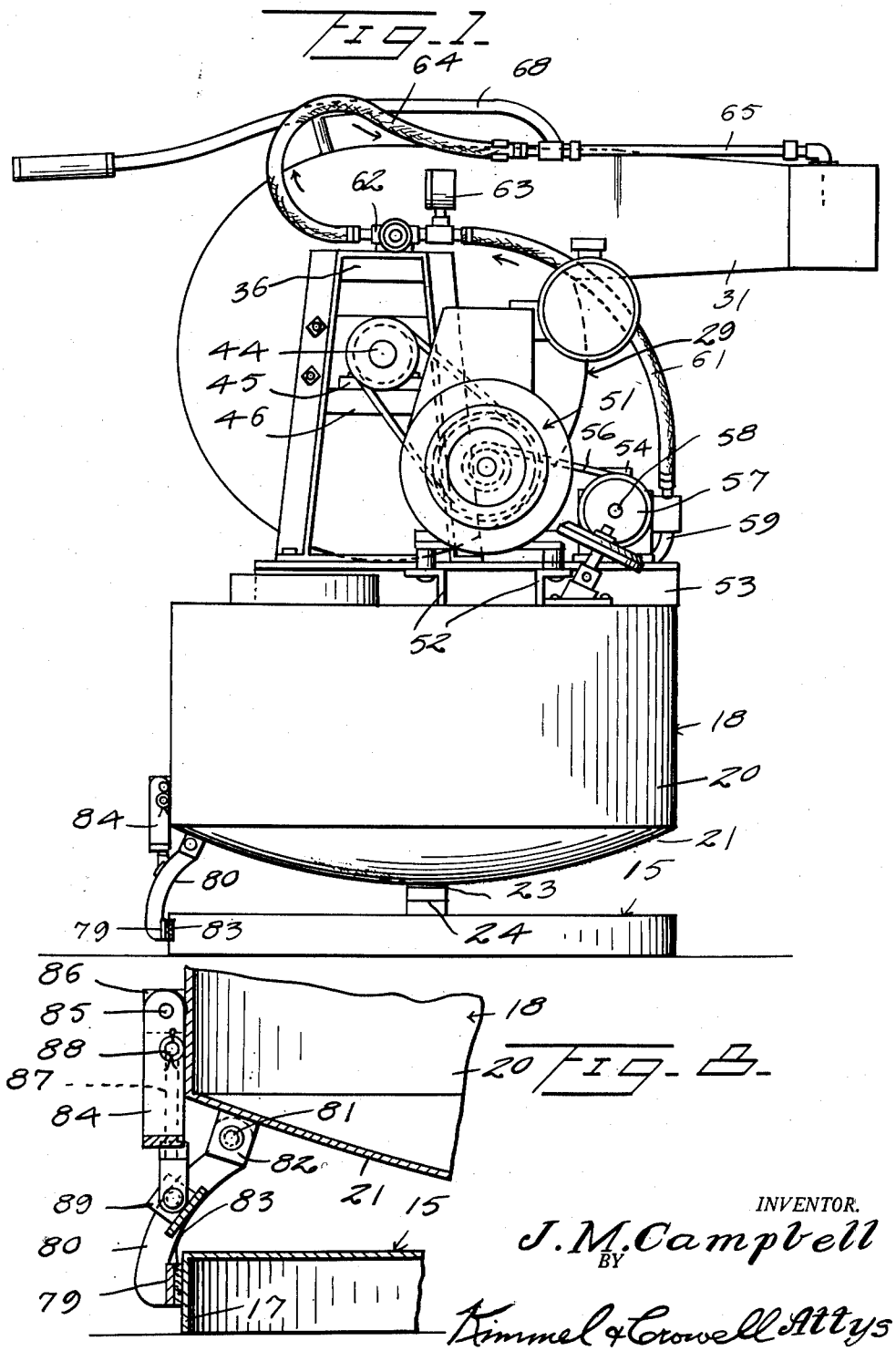

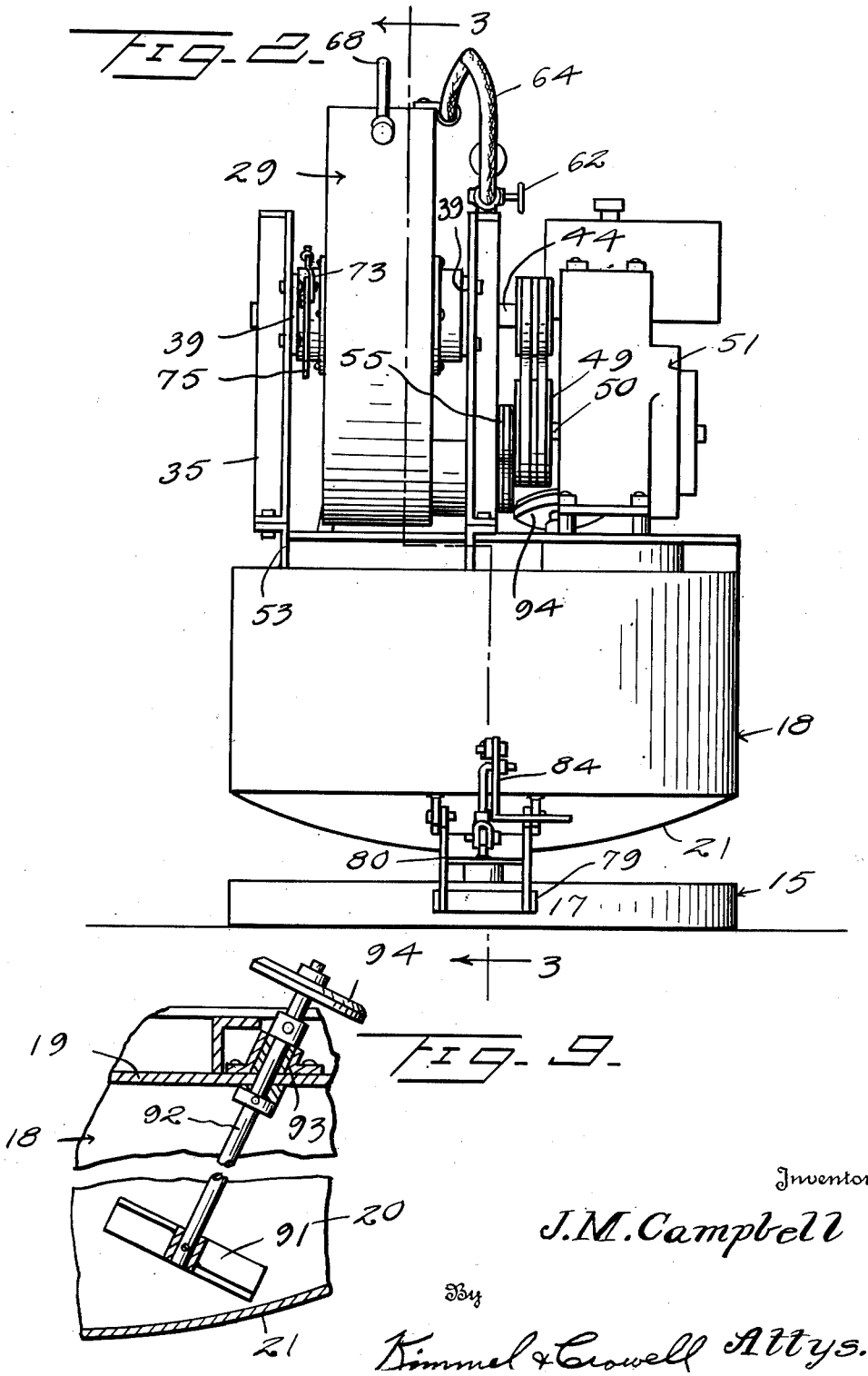

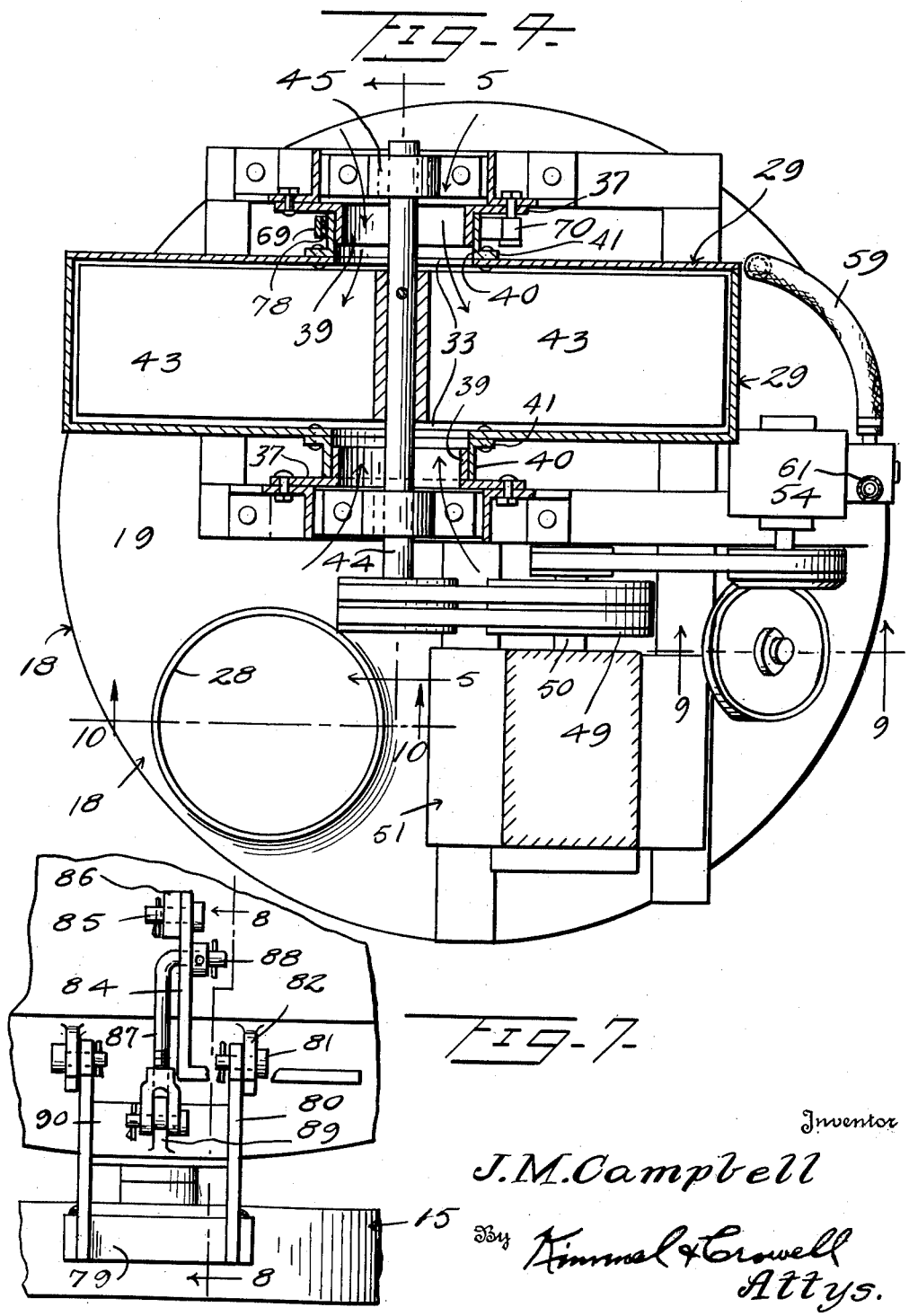

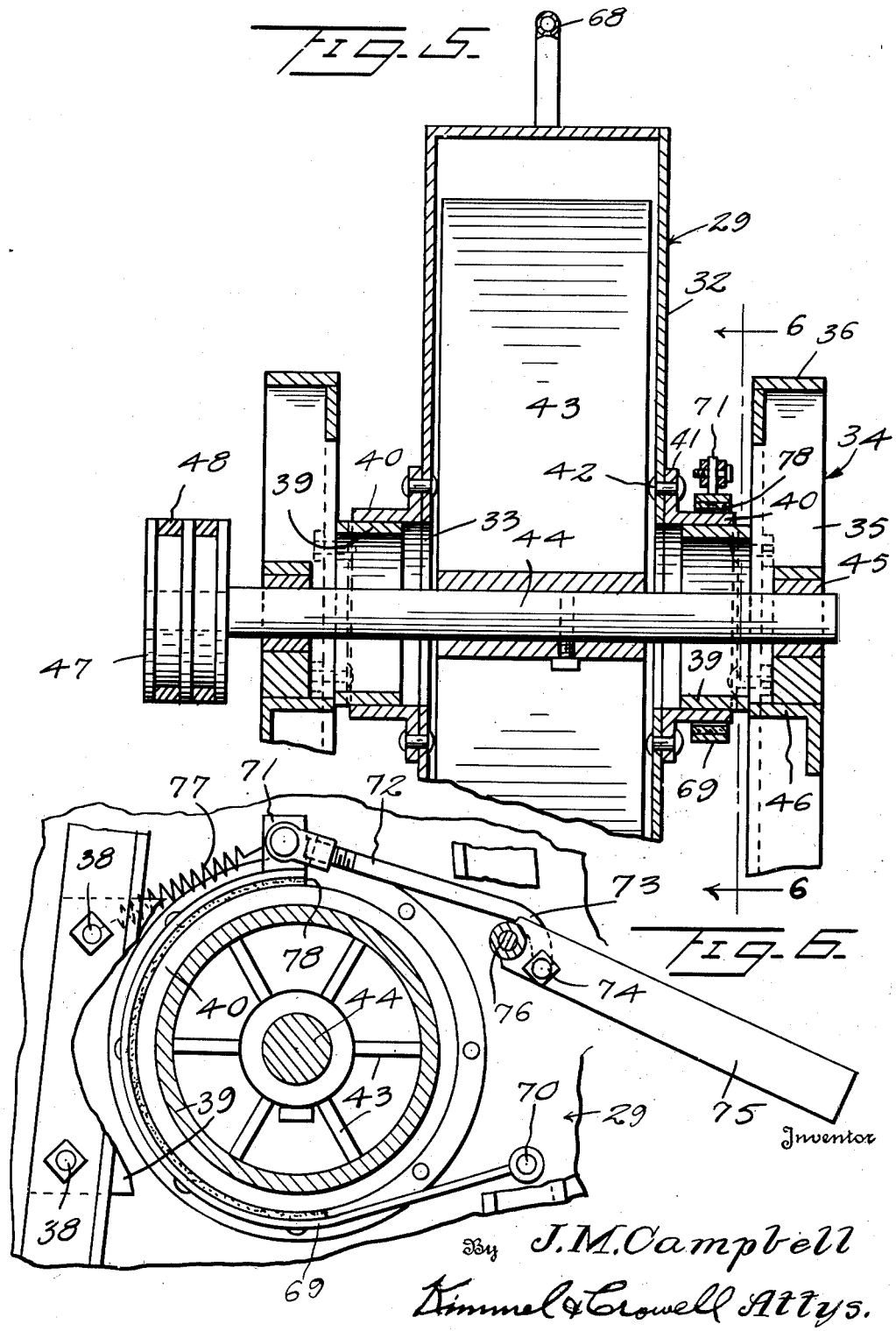

Patented Mar. 4, 1952

2,587,965

UNITED STATES PATENT OFFICE 2,587,965

INSECTICIDE SPRAYER

James M. Campbell, Greenfield, Mass.

Application October 11, 1948, Serial No. 53,837

7 Claims. (Cl. 299—62)

This invention relates to an insecticide sprayer.

An object of this invention is to provide a sprayer for insecticide or like material which includes a portable structure embodying a blower rockably mounted on a reservoir which is mounted for adjustment about a vertical axis with a power unit on the reservoir. The axis for the blower is at right angles to the axis of the reservoir so that the blower may be substantially universally adjusted in order to provide for discharge of the material as a fog or mist.

Another object of this invention is to provide an improved means for locking the blower in angularly adjusted position and for locking the reservoir in adjusted position with respect to the base.

A further object of this invention is to provide a portable sprayer which may be mounted on any mobile truck body or chassis and is capable of spraying various types or kinds of insecticide.

A further object of this invention is to provide a sprayer of this kind which has a large capacity so as to provide for spraying relatively large areas.

With the above and other objects in view, my invention consists in the arrangement, combination and details of construction disclosed in the drawings and specification, and then more particularly pointed out in the appended claims.

In the drawings,

Figure 1 is a detail side elevation of an insecticide sprayer constructed according to an embodiment of my invention, Figure 2 is a detail rear elevation of the device, Figure 3 is a vertical section taken substantially on the line 3—3 of Figure 2, Figure 4 is a horizontal section taken substantially on the line 4—4 of Figure 3, Figure 5 is a fragmentary sectional view taken on the line 5—5 of Figure 4, Figure 6 is a fragmentary sectional view taken on the line 6—6 of Figure 5, Figure 7 is a fragmentary rear elevation showing the lower or reservoir brake structure, Figure 8 is a fragmentary sectional view taken on the line 8—8 of Figure 7, Figure 9 is a fragmentary sectional view taken on the line 9—9 of Figure 4, Figure 10 is a fragmentary sectional view taken on the line 10—10 of Figure 4.

Referring to the drawings, the numeral 15 designates generally a base which is of inverted cup-shape, embodying a horizontally disposed plate 16 and a marginal depending flange 17.

The base 15 has rotatably mounted thereabove a reservoir or tank 18 which includes a top wall 19, a cylindrical wall 20, and an inverted dome-shaped bottom wall 21. A vertically disposed tube 22 is fixed between the top and bottom walls 19 and 21 respectively, and a bearing bushing or boss 23 is carried by the lower side of the bottom wall 21 for engagement about a vertically disposed shaft 25. The shaft 25 is fixed in a boss 26 which is fixed relative to the base 15 and the shaft 25 extends through the bearing 24 and the tube 22, having mounted on the upper end thereof a nut or fastening means 27.

The reservoir or tank 18 is adapted to contain liquid insecticide and the insecticide is discharged into the tank 18 through a filler opening 28 formed in the top wall 19. A blower generally designated as 29 is disposed on top of the tank 18 and includes a blower housing 30 having a discharge neck 31 extending therefrom.

The side walls 32 of the blower 29 are formed with centrally disposed air intake openings 33 and the blower 29 is rockably carried by a pair of upright blower supporting members 34. The blower supporting members 34 each include a pair of upwardly convergent angle members 35 connected together at their upper ends by a connecting member 36, and the supporting members 35 have secured therebetween a plate 37 secured to the supporting members 35 by fastening means 38.

Each plate 37 has fixed to the inner side thereof a bearing sleeve 39 which engages in a cylindrical bushing 40 carried by an annular flange 41 which is fixed by fastening means 42 to the side walls 32 of the blower housing 30. One of the bushings 40 not only rockably and rotatably supports the blower 29, but also constitutes a brake drum, the purpose for which will be hereinafter described.

The blower 29 includes a blade structure 43 secured to a shaft 44 which is journalled through bearings 45 carried by a horizontally disposed bearing supporting member 46 which is secured between the supporting members 35. One end of the shaft 44 has secured thereto one or more grooved pulleys 47 about which one or more belts 48 are trained, and the belts 48 are also trained about driving pulleys 49 mounted on a shaft 50 connected with and operated by a power member 51.

The power member 51 is constructed in the form of a small internal combustion engine and is mounted on a pair of angle members 52 secured to the top wall 19. The blower supporting members 35 are secured to additional angle members 53 which are secured to the top wall 19 and are disposed at right angles to the angle members 52.

A pump 54 is secured to the angle members 53 and is driven from the power member 51 through a driving pulley 55 mounted on the drive shaft 50 and about which a belt 56 is trained.

A grooved pulley 57 is mounted on the pump shaft 58 and the belt 56 is trained about the pulley 57. The intake side of the pump 54 is connected by means of a suction hose 59 to a suction pipe 60 which is secured to the top wall 19 and extends into the tank 18 adjacent the bottom wall 21. The outlet side of the pump 54 is connected by means of a flexible tube 61 to a valve 62, and a pressure meter 63 is interposed in hose 61 between valve 62 and the outlet side of the pump 54. The valve 62, as shown in Figure 1, is mounted on the top of the connecting member 36 and the valve 62 has secured thereto a second flexible tube or hose 64 which is connected to a pipe 65, fixed lengthwise of the neck 31.

A nozzle 66 is disposed in the forward end of the neck 31, being positioned substantially concentric of the interior of the neck 31 and is connected by connecting means 67 to the pipe 65. An elongated handle 68 is secured to the housing 30 on the upper side thereof and extends rearwardly so that the blower 29 may be angularly adjusted about the horizontal axis of the shaft 44.

In order to provide a means whereby the blower 29 may be locked in angularly adjusted position with the neck 31 disposed on either a downward inclination, or in a horizontal position or an upward inclination, I have provided a brake band 69 which engages about one of the bushings 40. One end of the band 69 is fixed as at 70 relative to the supporting members 35 and the other end of the band 69 has secured thereto an ear 71.

An elongated link 72 is connected at one end to the ear 71 and is formed at its rear or outer end with a downward bend 73, the terminal end of which is secured by fastening means 74 to the brake adjusting lever 75. The lever 75 is pivotally mounted on a pivot member 76 secured to one of the upright members 35 and when lever 75 is rocked downwardly to braking position, the axis of pivot member 74 will be disposed in a horizontal plane below the axis of pivot member 76, as shown in Figure 6.

A spring 77 is connected at one end to the ear 71 and is connected at the other end to one of the fastening members 38 for the adjacent bearing supporting plate 37. The brake band 69 has secured to the inner side thereof a lining 78 which is adapted to engage the peripheral surface of the adjacent bushing 40.

The tank 18 is adapted to be fixed in adjusted position with respect to the base 15 by means of a brake structure which includes a shoe 79 which is carried by a pair of supporting arms 80 which are pivotally mounted on pivot members 81 extending through a pair of ears 82 secured to the lower side of the bottom wall 21.

The shoe 79 has secured to the inner concave side thereof a brake lining 83 which is engageable with the flange 17 of the base 15, this flange constituting a brake drum correlating with the shoe 79 and the lining 83 in holding the tank 15 against rotation about the shaft 25. The brake shoe is adapted to be released relative to the flange 17 or to be swung downwardly in a braking position by means of a crank lever 84 which is pivotally mounted on a pivot 85 extending through the ear 86 which is carried by the side wall 20 of the tank 18. A link 87 having a right angular upper end 88 which is pivotally secured to the lever 84 below the pivot 85 is connected at its lower end to an ear 89 carried by a connecting plate or bar 90 secured between the arms 80.

As shown in Figure 8, the axis of the right angular portion 88 of the link 87 is disposed offset from the pivotal connection of the lever 84, with ear 86 so that when crank lever 84 is swung downwardly to a substantially vertical position, as shown in Figure 8, the brake shoe 99 will be swung downwardly and inwardly and locked in a braking position against the flange 17.

In the use and operation of this device, the base 10 may be mounted on a truck or other mobile structure, and the tank 18 is filled with a liquid insecticide. This insecticide is maintained in agitated condition by means of an agitating blade 91 which is mounted on an agitator shaft 92. The shaft 92 is journalled through a bearing 93 carried by the top wall 19 of the tank 18 and the upper end of the shaft 92 has secured thereto a friction wheel 94, which in the present instance engages the pulley 57. When power member 51 is operated, blower 29 will blow air out through the neck 31 and the pump 54 will force the insecticide through the spray nozzle 66, the spray being carried by the stream of air passing through the neck 31. The amount of insecticide which is discharged into the forward end of the neck 31 is regulated by means of the valve 62.

The blower 29 is angularly adjusted with respect to the mobile structure on which this device is mounted by adjusting the lower brake structure, including the shoe 79. The vertical inclination of the neck 31 is adjusted by releasing brake band 69 through raising of lever 75 to a released position. When the neck 31 is disposed in the desired vertically adjusted position, the blower may be locked in such adjusted position by swinging brake lever 75 downwardly to a braking position.

I do not mean to confine myself to the exact details of construction herein disclosed, but claim all variations falling within the purview of the appended claims.

What I claim is:

1. In an insecticide sprayer, a base including a circular upstanding wall, a vertical shaft carried by said base centrally of said wall, a reservoir journalled on said shaft for rotation about a vertical axis, a pair of upstanding frame members mounted on the top of said reservoir, horizontally aligned bearings carried by said frame members, an impeller shaft journalled in said bearings for rotation about a horizontal axis, an impeller fixed on said shaft, a blower housing extending about said impeller and formed with a discharge neck, air inlet openings formed in the opposite side walls of said housing, a cylindrical bushing extending outwardly from each of said side walls and surrounding the inlet opening formed therein, a bearing sleeve carried by each of said frame members concentrically with said impeller shaft bearings and rotatably engaging said bushings and supporting said housing thereon for rotation about a horizontal axis, brake means engaging at least one of said bushings for locking said housing in selected position relative to said reservoir, and brake means carried by said reservoir and engageable with said upstanding wall on said base for locking said reservoir in selected position relative to said base.

2. A device as set forth in claim 1, wherein said first mentioned brake means includes a brake band extending about a substantial portion of the circumference of said bushing, means securing one end of said band to the adjacent frame member, a lever having one end thereof pivotally mounted on said adjacent frame member, link means connecting the other end of said band to said lever intermediate the ends of the latter whereby rocking of said lever away from said bushing will effect braking engagement between said band and said bushing, and spring means connected to said other end of said band and to said adjacent frame member and adapted to urge said band to released position.

3. The device as set forth in claim 2 wherein said link means includes an elongated bar having one end connected to said other end of said band, and formed with a laterally offset portion on the other end of said bar connected to said lever whereby when said lever is rocked to braking position the point of connection of the offset portion to the lever will be disposed beyond a line passing through the pivot axis of said lever and said one end of said bar to thereby maintain the lever in braking position.

4. A device as set forth in claim 1 wherein said second mentioned brake means includes a brake shoe engageable with said upstanding wall, supporting arms extending from said shoe and rockably carried by said reservoir for rocking of said shoe radially of said upstanding wall, an operating lever having one end pivotally carried by said reservoir above said supporting arms, and a connecting link extending between said operating lever and said supporting arms, the point of connection of said link to said lever being offset relative to the axis of pivoting of the latter whereby said brake shoe is urged into braking engagement with said upstanding wall by downward pivoting of said lever and is retained in such engagement when said point of connection of said link to said lever is disposed inwardly of said axis of pivoting of said lever.

5. In an insecticide sprayer, a base including a circular wall, a reservoir rotatably disposed above said wall, spaced support members carried by said reservoir for rotation therewith, horizontally aligned bearings carried by said supports, an impeller shaft journalled in said bearings, an air impeller fixed on said shaft for rotation therewith about a horizontal axis, a blower housing disposed around said impeller and formed with a discharge neck opening outwardly therefrom, an air inlet opening into said housing, a cylindrical bushing extending outwardly from each side of the housing, bearing sleeves carried by said supports concentrically with said impeller shaft bearings and rotatably engaging said bushings and supporting said housing for rotation about the axis of said impeller shaft, brake means engaging at least one of said bushings for locking said housing at different points of rotation, and a second brake means engageable between the reservoir and base for locking said reservoir in selected position relative to said base.

6. In an insecticide sprayer, a base, a sprayer mount rotatably carried by said base for rotation in a horizontal plane, a pair of spaced bearing supports carried by said mount, bearings carried by said supports, a shaft journalled for rotation in said bearings, an air impeller fixed to said shaft for rotation therewith, a pair of inwardly protruding sleeve members fixedly carried by said bearing supports concentric with said shaft, a housing for said impeller rotatably mounted thereabout and rotatably mounted on said sleeve members, said housing being formed with air inlet and air outlet openings, brake means engageable between the housing and said supports for locking said housing at different points of rotation in a vertical plane, and a second locking means engaging between the base and sprayer mount for locking said mount at different points of horizontal rotation.

7. In an insecticide sprayer, a base, a reservoir comprising a sprayer mount rotatably carried by said base for rotation in a horizontal plane, a pair of spaced bearing supports carried by said mount, bearings carried by said supports, a shaft journalled for rotation in said bearings, an air impeller fixed to said shaft for rotation therewith, a pair of sleeve members fixedly carried by said bearing supports concentric with said shaft, a housing for said impeller rotatably mounted thereabout and rotatably mounted on said sleeve members, said housing being formed with air inlet and air outlet openings, and brake means engageable between the housing and said supports for locking said housing at different points of rotation in a vertical plane.

JAMES M. CAMPBELL.

REFERENCES CITED

The following references are of record in the file of this patent:

UNITED STATES PATENTS

| Number | Name | Date |
| --- | --- | --- |
| 1,829,298 | Rimedio | Oct. 27, 1931 |
| 2,238,120 | Launder | Apr. 15, 1941 |
| 2,374,955 | Raper | May 1, 1945 |
| 2,429,374 | Shade | Oct. 21, 1947 |
| 2,454,339 | Poots et al. | Nov. 23, 1948 |